United States Patent [19]
Bellis

[11] Patent Number: 5,186,147
[45] Date of Patent: Feb. 16, 1993

[54] MULTI-PORT RETURN TYPE PRESSURE REGULATOR

[75] Inventor: Peter D. Bellis, Carson City, Nev.

[73] Assignee: Mallory, Inc., Carson City, Nev.

[21] Appl. No.: 682,625

[22] Filed: Apr. 9, 1991

[51] Int. Cl.$^5$ .............................................. F02M 41/00
[52] U.S. Cl. .................................. 123/457; 123/452; 137/510
[58] Field of Search ............... 123/452, 459, 460, 457, 123/511; 137/510, 883, 863, 885, 116, 596.13, 115, 119

[56] References Cited

U.S. PATENT DOCUMENTS

| | | | |
|---|---|---|---|
| 726,841 | 5/1903 | Ball, Jr. | |
| 1,368,475 | 2/1921 | Blakely | 123/514 |
| 1,876,938 | 9/1932 | Horne | 137/510 |
| 1,998,223 | 4/1935 | Czarnecki, Jr. | 137/116 |
| 2,647,530 | 8/1953 | Jaquith | 137/116 |
| 2,680,447 | 3/1950 | Groves | 137/116 |
| 2,692,612 | 10/1954 | Drane | 137/510 |
| 2,901,031 | 8/1959 | Powell | 123/452 |
| 2,937,636 | 5/1960 | Aldinger | 123/452 |
| 2,966,164 | 12/1960 | Britton | 137/73 |
| 3,068,893 | 12/1962 | Nicolaus | 137/510 |
| 3,079,974 | 3/1963 | Cardi | 137/510 |
| 3,405,730 | 10/1968 | Baumann | 137/510 |
| 3,741,182 | 6/1973 | Wade | 123/459 |
| 4,044,746 | 8/1977 | Kaye | 123/514 |
| 4,140,089 | 2/1979 | Kueny et al. | 137/510 |
| 4,237,849 | 12/1980 | Roberts | 123/513 |
| 4,257,378 | 3/1981 | Bascle, Jr. | 123/514 |
| 4,284,039 | 8/1981 | Bellicardi et al. | 137/510 |
| 4,291,657 | 9/1981 | Codrington | 137/115 |
| 4,314,539 | 2/1982 | Schade | 123/514 |
| 4,541,395 | 9/1985 | Geiger | 123/514 |
| 4,543,935 | 10/1985 | Tuckey | 123/459 |
| 4,609,006 | 9/1986 | Parkison | 137/119 |
| 4,646,700 | 3/1987 | Tuckey | 123/510 |
| 4,688,600 | 8/1987 | Kreth | 137/596.13 |
| 5,111,793 | 5/1992 | Deeds | 123/457 |
| 5,113,831 | 5/1992 | Grant | 123/457 |

*Primary Examiner*—Carl S. Miller
*Attorney, Agent, or Firm*—Roylance, Abrams, Berdo & Goodman

[57] ABSTRACT

A fuel regulator for controlling one or more carburetors and having a return to the fuel tank arrangement. The invention comprises a unique arrangement of an hourglass shaped plunger that permits virtually unrestircted flow through the body of the regulator from the inlet to the one or more ports which lead to the single or multiple carburetors. A method of operation wherein the return fuel flow is never completely shut off is provided during normal operation. This provides the advantages of reduced demands on the manufacture of the return line seat, and always permits at least some flow through the return line during the normal operation. Thus, a highly efficient, high volume, low pressure regulator for carburetted, high performance engines is provided.

20 Claims, 2 Drawing Sheets

MULTI-PORT RETURN TYPE PRESSURE REGULATOR

FIELD OF THE INVENTION

This invention relates to a pressure regulator for supplying fuel to internal combustion engines having single or multiple carburetors. The invention regulator is of the type which returns some of the fuel from the regulator back to the fuel tank. The field of this invention is to be distinguished from the somewhat analogous but actually different field wherein the engine is of the fuel injected type, rather than a carburetted engine.

BACKGROUND OF THE INVENTION

The invention is designed for use in high performance, rigorous environments, such as automobile racing and certain industrial applications. The environment wherein the invention is particularly adapted for use is characterized by relatively large engines of high power having one or more carburetors and which have a correspondingly high fuel demand, and wherein the fuel demand changes rapidly. However, where carburetors are used, which is the environment of the invention, the fuel needs to be supplied at a relatively low pressure while at the same time being supplied in high volume. Further, this high volume of fuel must be supplied in a manner which is highly responsive to the engine's rapidly changing demand for fuel and, all of this needs to be done at a relatively low pressure. In carburetted engines, excess pressure at the carburetor can cause flooding of the carburetor. Such flooding, especially in high power large fuel consumption engines, can cause a fire, at the worse, and will cause disruption of engine operation, at the minimum.

It has been heretofore unknown to use a return type pressure regulator in regard to such carburetted systems, although return type pressure regulators have been used with engines having fuel injection systems.

SUMMARY, FEATURES AND ADVANTAGES OF THE INVENTION

In overall summary, the invention provides a pressure regulator which can control a high volume, low pressure flow of fuel, which can accurately control that flow, and which can do so in a manner highly responsive to rapidly changing fuel demand. This is particularly adapted to use with high performance single or multi-carburetor internal combustion engines. The invention can feed up to five carburetors simultaneously. In practice, the invention can be used to feed even more than five carburetors by "splitting" output lines. This is not a highly recommended practice, but it is in fact done, especially when dealing with relatively small carburetors.

One important feature of the invention is the provision of a unique hourglass shaped control plunger. This plunger provides a minimum of flow restriction to the fuel. One end of the plunger is attached to a control diaphragm and the other end is formed into a conical shape. This cone end operates with a simple seat to control, but not stop, under normal operating conditions, the return of fuel from the regulator to the fuel tank.

Where surplus fuel is supplied in order to maintain engine performance, still then another feature of the invention is its method of operation, wherein, under normal operating conditions, the fuel control plunger and its cone are always at least a little bit open with respect to the seat. Even when in a full throttle or high acceleration situation where surplus fuel is supplied in order to maintain engine performance, still then at least a little fuel will be returned to the tank through the invention regulator. This is believed to be a significant step forward for the invention with respect to the prior art which did not employ such return type pressure regulators on carburetted engines.

Yet another feature and advantage of the invention in this same regard is the fact that the seat within the regulator body does not have to be highly accurately machined, since, in normal operation, there is never a seal formed between the plunger and the seat. This achieves a substantial cost saving in manufacture, since precision machining or separate sealing means to form an accurate and fluid tight seal which can withstand high pressure are not required at all in the present invention.

In carburetted engines, the pressure regulator is located between the fuel pump and the engine, with a return line from the regulator to the fuel tank. Often, electric pumps that operate at a constant speed are used. As engine demand changes, the pressure in the fuel line will vary correspondingly. The carburetor however operates best with a constant fuel supply pressure, usually between 7 psi and 5 psi. The invention regulator produces such constant pressure at the carburetor at all levels of fuel demand and even during rapid changes in fuel demand. The invention also permits easy adjustment of the set pressure. This group of advantages in this environment are believed to be unique to the invention and substantial improvements in the art.

The body of the invention pressure regulator has numerous features and advantages of its own. It is of a simple hexagonal shape. Likewise, the lid used to carry the plunger and diaphragm assembly and to provide a closed chamber is formed of the same material. This permits advantages of manufacturing, ease of use of automated manufacturing machinery, as well as the ability to use standard sizes and shapes of raw material in such automated manufacturing machinery. The body design also permits use of relatively large diameter fuel hose fittings, which is itself an advantage. Further, the body design makes mounting and dismounting of these fittings simple and efficient.

The chamber within the body is of a very simple open shape, essentially it is a cylindrical drilled hole, and this, together with the hourglass shape of the plunger, permits unrestricted flow at high volume through the regulator.

At the same time, these shapes of the parts as described in the immediately preceding paragraphs permit provision of such a regulator in accordance with the invention of an extremely compact overall size. This is of significant advantage in many environments. There is also a corresponding advantage of reduced weight which, again, is an advantage, especially in the racing environment.

The invention includes a mounting bracket of a unique but simple and advantageous design. It is basically of an "L" shape, with one leg formed as a flange with mounting holes, and the second leg bifurcated to fit around the return nipple. The bracket is reversible to thereby lend greater versatility to the invention as to its mounting on an engine or in an engine compartment.

The design of the invention regulator permits it to be located at any relative position relative to the tank. That is, it does not necessarily have to be located above or below the tank, no gravity feed is used, rather, the returned fuel is pumped by the fuel pump through the regulator back to the tank. Further, it is desirable that the regulator be as close to the carburetor or carburetors as possible because efficiency decreases as the length of these fuel lines increase. The bracket of the invention discussed above permits achievement of this desideratum.

Yet another feature of the invention is that means are provided, of a simple and proven design, to permit regulation or adjustment of the pressure on the control plunger to thereby permit use of the invention with different carburation systems and/or different engines, as may be needed. With these adjustment means, the invention regulator facilitates maintenance line pressure of approximately 7 psi. 7 psi is, commonly, the highest pressure that can be held in normal operation of most carburetor float bowl valves. Successful operation has been achieved with the invention regulator at lower pressure down to 5 psi, and it is thought even lower pressures can be achieved. All of this adds to the versatility and commercial advantages of the invention with respect to the prior art. Especially as to operation at pressures below 7 psi, the invention is an important improvement in the art.

Yet another advantage of this hexagonal outside shape is that it allows the use of a wrench on the body of the regulator to protect against twisting of the entire regulator on its mountings when the pressure adjustment means are adjusted. That is, the tightening torque applied to the locknut of the adjusting means can be counterbalanced by the use of another wrench applied to the regulator body, thus preventing damage to other fittings, especially the return line and its connection to the invention regulator.

The hexagonal shape of the regulator body automatically provides six ports for connection to the regulator. Each of them is conveniently spaced from the others and significant versatility is afforded thereby. That is, one could provide a single inlet and, at the maximum, five outlets to five carburetors. If only three carburetors were used, several ports could be easily plugged using standard threaded plugs. If fewer than five carburetors are needed, then a pressure gauge could also be used at one of the ports, as is often desirable in the high performance environments with which these types of engines are used. The return port is provided centrally at the bottom of the chamber, again simplifying manufacturing and freeing all six surfaces for use as ports in the main body of the invention regulator.

The invention regulator can also be used to advantage with two fuel pumps arranged in parallel. Such arrangements of two smaller pumps used to function as one larger pump are often used.

Return type pressure regulators have certain advantages over non-return style pressure regulators. These advantages include reduced electric fuel pump current draw, allowing acceptable continuing engine operation even when one of two fuel pumps should fail, and maintenance of an open fuel path from the regulator to the fuel tank, which in itself produces numerous advantages.

BRIEF DESCRIPTION OF THE FIGURES OF THE DRAWINGS

The above and other features, objects and advantages of the invention will be best understood from a reading of the following detailed description taken in conjunction with the attached drawings, which drawings also form a part of this disclosure, and in which.

DETAILED DESCRIPTION OF THE PREFERRED EMBODIMENTS

Figure 2:
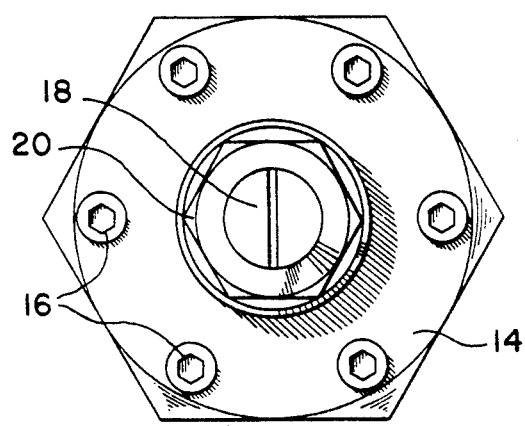
FIG. 2 is a top plan view thereof.

Referring now to the Figures of the drawing, there is shown a pressure regulator 10 embodying the invention. Regulator 10 is made up of a body 12 and a cap 14, a plurality of screws 16 being provided to hold these two parts together. Each of the parts 12 and 14 is of hexagonal cross-sectional shape, see FIG. 2. Mounted in the top portion of the cap 14 is an adjustment screw 18 which is held in adjusted position by a jam nut or locknut 20.

The hex shapes of the two main body parts 12 and 14 and the nut 20 allow the use of standard tools to counteract the torque which may be applied to nut 20 by adjusting screw 18. That is, by holding the regulator 10 stationary by application of a standard wrench to the hexagonal body 12 when using the adjustment means 18 and 20, there is no torque passed on to other tubes, fittings, etc. that may be attached to the various ports of the regulator, as described in more detail below.

Further, the hexagonal shape of the body 12 provides maximum areas for the six ports formed therein. Still further, making the main body 12 in a single piece in this manner saves both labor and tooling expense over making the housing in different manners involving multiple pieces corresponding to body 12. Further, by using this hexagonal shape, conventional manufacturing methods, including robot machining centers, numerically controlled equipment, automatic screw machines that use hex bar stock, as well as other techniques, can all be used, all of which result in substantial savings in manufacturing as well as increased reliability of the resulting parts.

Figure 1:
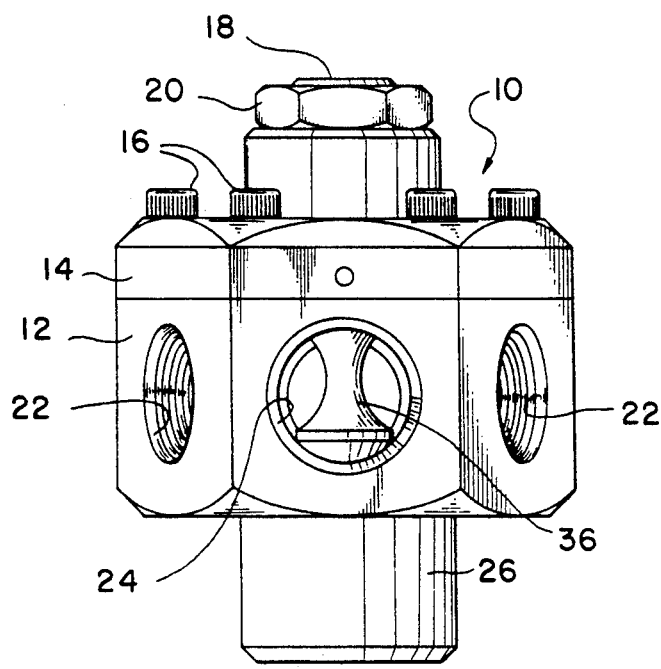
FIG. 1 is a front elevational view of a pressure regulator embodying the invention.

The body 12 is formed with a central cylindrical opening into which six ports, five of which are designated 22, communicate. As shown in the drawing, all six ports are threaded with standard threads. As indicated in FIG. 1, one of these ports, designated 24, is larger than the other five. The reason for this will be explained below. The enlarged port 24 is shown on the right hand side of FIG. 3.

Figure 3:
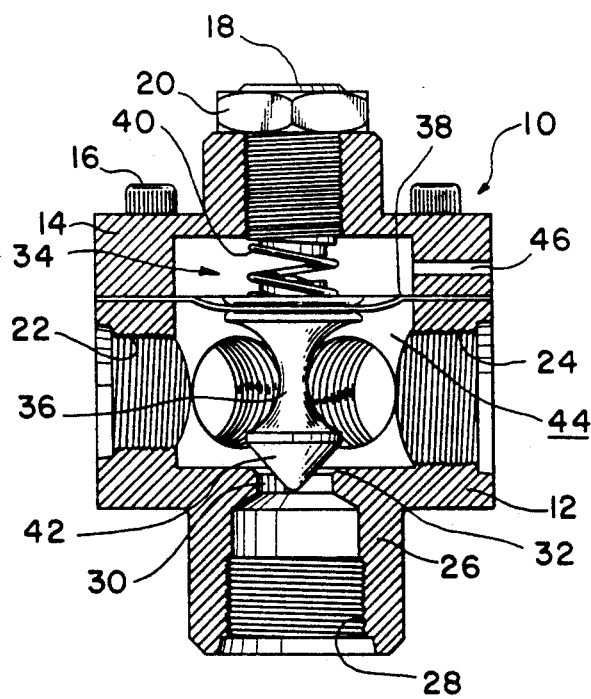
FIG. 3 is longitudinal cross-sectional view thereof with some parts shown in full elevation and some parts broken away for the sake of clarity.

Body 12 is formed with a nipple portion 26 which is in turn formed with a threaded opening 28. Between the inner end of the threaded opening 28 and the central chamber in body 12 there is formed a fuel return port 30. Port 30 is formed with a conical valve seat 32. Means are provided to control the flow of fuel through the central chamber in the regulator 10 and through the return port 30. To this end, there is provided a diaphragm assembly 34. Assembly 34 comprises a plunger member 36 which is fixed to a diaphragm 38 both of which are urged normally downwardly, as shown in FIG. 3, by a spring 40. The adjustment screw 18 controls the tension on spring 40. As is clear to those skilled in these arts, the amount of compression of this spring 40 provided by the adjusted position of the screw 18 corresponds to the pressure which will be controlled by the regulator 10 overall.

The opening 28 in nipple 26 is larger than the openings 22 and may be of the same diameter as the enlarged opening 24. The reason for this is to avoid the creation of back pressure on the fuel inside the regulator. Stated another way, this enlarged return port allows for a lower set pressure at a relatively higher fuel flow rate.

The edges of the diaphragm 38 are sandwiched, as shown, between the two main body parts 12 and 14 and are held securely and sealingly in position by the tension of the screws 16. The cap member 14 is formed with a central opening similar in configuration to that formed in the body 12. These two cavities face each other on opposite sides of the diaphragm 38, and together define a chamber 44. The plunger end of the diaphragm assembly 34 fits in the lower half of this chamber 44, which is the portion formed in the body 12. The spring fits in the upper part of this chamber 44 on the upper side of the diaphragm 38.

A diaphragm vent opening 46 is provided in the cap 14 to facilitate normal operation of the diaphragm, in a well known manner.

In operation, any one of the six openings 22 and 24 can then be used as the inlet from a fuel pump. Where large capacities of fuel are to be handled, it is desirable to use the enlarged opening 24 as the inlet in order to accommodate the larger fuel flow into the regulator. Up to five carburetors can then be connected to any of the remaining five ports 22. Alternatively, some of these ports can be plugged or a pressure gauge could be provided, as is often desirable in certain environments in which the invention is used. The threaded openings in these ports 22 and 24 facilitate the provision of a plug which is simply screwed into place and blocks off the opening.

Likewise, threaded opening 28 which leads to the return to the fuel tank is easily accommodated with standard hardware parts and tubing and the like to facilitate connection of the invention regulator to the other components of a carburetted engine system.

The sizes and relationships of the parts together with the strength of the spring 40 and the position of the adjusting screw 18 are all designed and configured and set so that the conical end 42 of the plunger 36 will not, during normal operation, contact the conical seat 32 of port 30. That is, in normal operation, even at high acceleration and full throttle of the engine being controlled by the invention regulator, there will still be some return fuel flow to the fuel tank. This improves the manner of operation of the invention and provides an additional advantage that no special care need be taken in forming the conical seat 32 and the conical end 42. That is, these parts can be manufactured to normal engineering standards. A sealing seat is often formed in prior art regulators. They require great care and substantial expense to form the parts and the surfaces to create such seals in such prior art regulators. Elimination of the need for such a seal is an important advantage of the invention and constitutes a substantial part of the method aspect of the present invention.

In normal operation, fuel will be supplied from the pump through port 24. The hourglass shape of the plunger 36 provides a minimum of restriction to the flow from the inlet out to all of the other five ports and the one or more carburetors served thereby. At the same time, there is no restriction on the manner in which the plunger 36 moves in response to engine demand. That is, if the engine's demand for fuel decreases, the pressure situation created on opposite sides of the diaphragm by spring 40 and the pressure in the fuel line, will cause the plunger assembly 34 to rise allowing more fuel to be bypassed. In this manner, the valve assembly is constantly monitoring and adjusting the amount of fuel returned to the fuel tank to thus match the fuel supplied by the invention regulator to the demand of the engine. All of this is done in a unique manner not heretofore possible prior to the invention at relatively low pressures and at extremely high total volume of fuel flow.

In that regard, the invention regulator can operate single or multi-carburetor racing engines at pressures as low as 5 psi and at fuel flows as high as 500 gallons per hour without any significant fluctuations in fuel delivery pressure. These operating parameters could not heretofore be accomplished in carburetted racing engines prior to the development of the present invention.

The invention includes means to permit mounting of the regulator 10 in proximity to the carburetor or carburetors of engines with which it may be used. As stated above, it is desired that the regulator be as close as possible to the carburetor in order to maximize its efficiency of operation.

Figure 4:
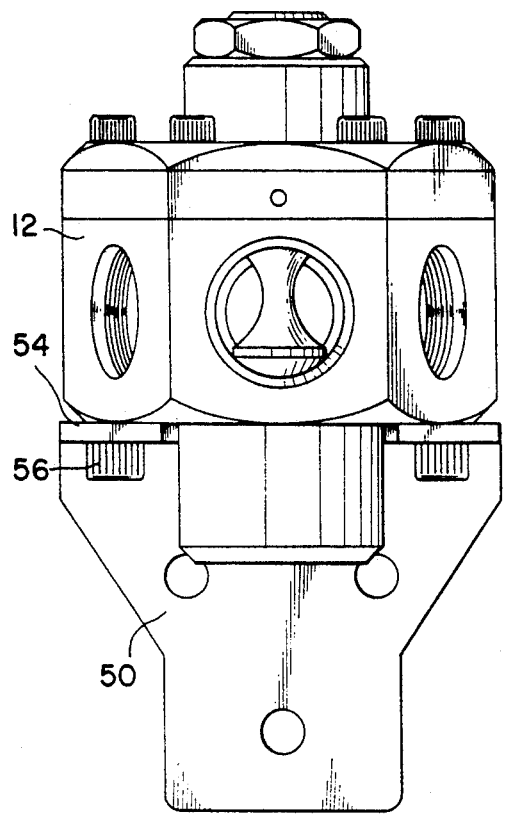
FIG. 4 is a view similar to FIG. 1 showing the mounting bracket of the invention.
Figure 5:
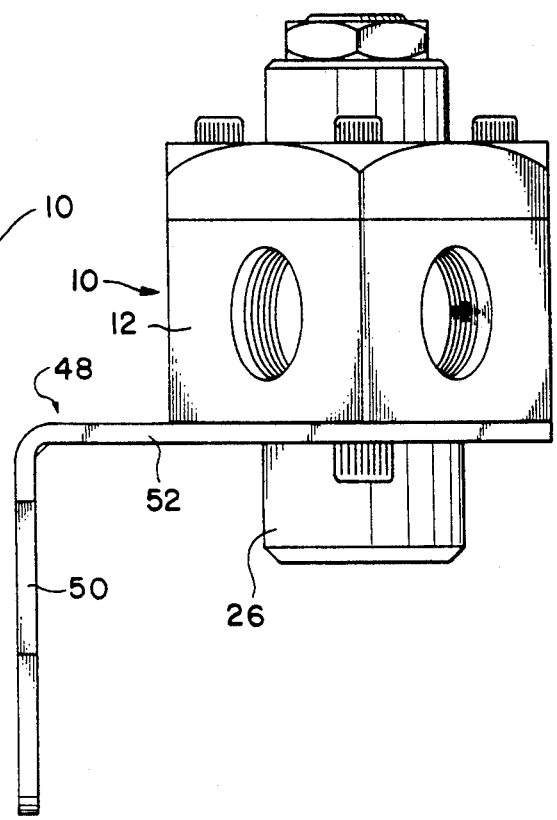
FIG. 5 is a left side elevational view of the arrangement shown in FIG. 4.
Figure 6:
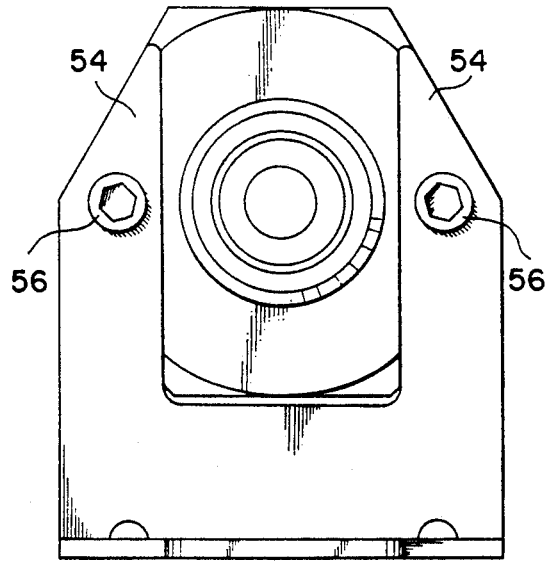
FIG. 6 is a bottom plan view of the arrangement shown in FIG. 4.

To this end, the invention includes a bracket 48 of a simple design, but having features and advantages of its own. As shown in FIGS. 4, 5 and 6, the invention bracket 48 is of a general "L" configuration, comprising a mounting leg 50 formed with a plurality of holes (see FIG. 4) to permit it to be mounted on or around the engine it is serving. Bracket 48 also includes a leg 52 which is formed with a pair of fingers 54. Screws 56 are provided to pass through suitably formed clearance openings in the leg 54 and to mate with suitable blind openings formed in the body 12 of the regulator 10.

FIGS. 4, 5 and 6 show the preferred mounting of bracket 48 on regulator 10. In this configuration, it should be noticed that all six of the ports in the body 12 are easily accessible.

Figure 7:
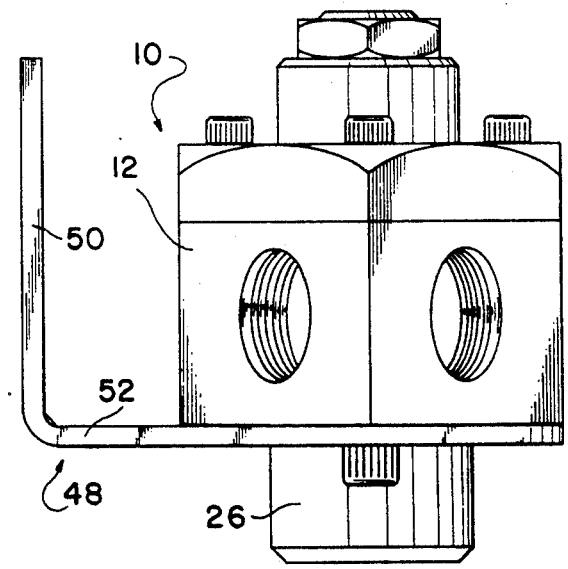
FIG. 7 is a view similar to FIG. 5 showing a second bracket mounting configuration.

However, sometimes, due to space or other restrictions, it may be impossible to mount the regulator 10 using the preferred bracket position of FIGS. 4, 5 and 6. In that case, the bracket 48 can be reversed and this position is shown in FIG. 7. This position is more compact, however, it may be that one of the ports will blocked by the mounting leg 50 of bracket 48. This may not be a problem as when fewer than all six ports are needed. However, this "upside down" mounting as shown in FIG. 7 may be an advantage where space limitations prohibit the preferred mounting shown in FIGS. 4-6.

An important advantage of the invention is its great sensitivity to pressure changes. Tests have been run to prove this advantage. The tests were run using a 250 gallon per hour fuel pump. A regulator, constructed according to the invention, such as that shown in the drawings, was compared to a four port non-return regulator of comparable size. Time data was not recorded. However, a comparison was made based on a one psi pressure drop. That is, both regulators were operated by the same pump at a normal pressure of 7 psi. A one psi pressure drop was imposed. In the case of the non-return regulator, the flow increase went from 0 to 13.6 gallons per hour. However, in the case of the invention regulator, the increase was tremendous. Under the same conditions, the invention regulator went from 0 to 124 gallons per hour in response to the same one psi pressure drop.

This dramatically illustrates the great sensitivity and quick response of the invention return type regulator.

Return type regulators are per se known, although not in regard to carburetted engines. Return type regulators have many inherent advantages over known non-return type regulators, and the present invention enjoys all of these advantages in common with its type of regulator.

With non-return regulators, when fuel demand is low, the column of fuel between the pump and the regulator remains virtually stationary. When acceleration occurs, the float bowl valves in the carburetor open and the fuel line pressure begins to drop between the carburetor and the regulator. The regulator reacts to this decreasing pressure by opening its orifice. The column of fuel between the pump and the regulator then has to be accelerated through the restriction at the regulator orifice in order to reach the float bowls. While this is happening, the fuel pump is still in the bypass mode, and will remain in that bypass mode until the pressure drop is significant enough to allow the bypass plunger in the pump to close. Not until then will the system receive the full output volume of the pump. Acceleration of a column of fuel and the time required for the fuel pump bypass to close can show up as a significant drop in fuel pressure in the line which results in a decrease in fuel volume being supplied to the regulator and thus to the carburetor itself.

With the invention return type regulator the column of fuel between the pump and the regulator is always in motion. This is due to the invention's feature of always maintaining at least some bypass of fuel so as to control the pressure of the fuel being supplied to the carburetor. Thus, the pump is never in any sort of bypass mode so that the full output volume is always available, or is at least very quickly available. In systems using the present invention regulator, upon acceleration, the carburetor's float bowl valves open and as pressure starts to decrease the regulator starts to restrict the amount of fuel being bypassed back to the tank, thereby maintaining pressure and fuel volume at the carburetor's float bowl.

In one successfully constructed embodiment of the invention, the surface area of the diaphragm equaled 1.77 in $^2$. The cross sectional area of the return orifice was 0.16 in $^2$. This area ratio, approximately 11:1, was necessary to achieve a quick reaction time at a flow rate of 500 gallons per hour and a minimum set pressure of 5 psi. If the return orifice size is decreased, the minimum set pressure goes up. If the return orifice size is increased, regulator set pressure becomes unstable at the minimum recommended flow rate of 250 gallons per hour. Pumps rated at 500 gallons per hour are the largest output fuel pumps commercially available at present. When and if larger pumps become available it is thought that the invention regulator will work satisfactorily with them also.

Another difference between return and non-return regulators has to do with the electricity consumption or current draw experienced by the electric fuel pump. With a non-return regulator the pump has to maintain a high pressure column of fuel between the regulator and the pump. This high pressure column of fuel is required to overcome acceleration forces produced by the vehicle. If the bypass in the fuel pump is set at a lower pressure (closer to the regulator's set pressure), the pump will remain in bypass while the vehicle is accelerating resulting in a loss of fuel pressure and volume.

With the invention return type regulator, the pump does not require a bypass at all. The column of fuel between the pump and regulator will increase above the regulator set pressure only during acceleration.

Fuel pump current draw is directly related to the pressure the pump has to maintain. With a non-return regulator pump pressure is required to be approximately twice that of the invention return type regulator. Thus, a non-return regulator will cause approximately twice the electricity consumption (current draw) at the pump as will the invention return type regulator.

Another difference has to do with the open path between the pump and the carburetor. With a non-return regulator, when fuel demand increases the static column of fuel between the regulator and the pump has to be accelerated through the restriction at the regulator orifice in order to reach the carburetor float bowl.

When using the invention return type regulator, there is always an open path between the fuel pump and the carburetor. The pressure is controlled by restricting the return orifice. When fuel demand increases, the column of fuel between the pump and the regulator does not have to be accelerated because it is constantly moving at the maximum output volume of the pump.

In many cases two pumps of smaller capacity are used in a parallel arrangement to simulate the effect of one larger pump. In the event one of these two smaller pumps should fail or its operation otherwise interrupted, the regulator set pressure will double causing possible carburetor flooding, in the case where a non-return regulator is being used. With the invention return type regulator and this two pump arrangement, in the event of a pump failure, it has been found that the pressure will decrease by a maximum of about 2 psi. That relative small drop in pressure will allow the engine to continue to perform adequately despite loss of part of the pump capacity.

The invention was designed primarily for use with multi-carburetor engines. However, it can also be used with a single carburetor. In that case, another of the ports might be used for a fuel pressure gauge. All of the advantages of the invention are realized in an engine having an single carburetor just as they are realized in multi-carburetor engine.

An advantage of the particular configuration of the invention regulator and its method of operation is that an overall extremely compact device results in accordance with the teachings of the invention. This is an advantage for its light weight, its ease in mounting, its ease of manufacture, and the like.

Another advantage of the simple cylindrical shape of the chamber 44 in the body 12 is that there are no "corners" or the like wherein the fuel can be trapped. The hourglass shape of the plunger 36 together with the cylindrical shape of the chamber 44, minimizes restriction and enhances the flow therethrough while not permitting any place for fuel to be trapped, harmful eddy currents to develop and the like. Many prior art regulators have this disadvantage of fuel flow traps. Such traps have an adverse effect on the unrestricted and even fuel distribution to the outlet ports, and such traps are not present in the invention.

Because the fuel is driven out of the chamber 44 and through port 30 back to the fuel tank under pressure from the fuel pump, the invention imposes no restrictions on the location of the regulator 10 as to its elevation with respect to the fuel tank. This is to be contrasted with prior art regulators that depend upon gravity feed wherein, of course, the regulator must be above the tank. However, the regulator should be as close as possible to the carburetor because regulator efficiency decreases as the distance between the regulator and the carburetor increases.

The method of operation of the invention is to permit the pump with which the invention regulator is being used to output more fuel than the maximum amount that the engine demands. Thus, the conical end 42 of the plunger 36 is designed to approach closely to the conical seat 32 but never to touch the conical seat 32 during normal operation. If such contact should happen, which could occur if the engine fuel demand should equal the maximum output of the fuel pump, the pressure would rapidly decrease and the regulator would cease bypassing fuel to the tank. Continued operation of the engine is this non-bypass mode would lead to a loss of fuel pressure and fuel volume which would result in a leaned out engine condition. Thus, the goal is to always operate the regulator in at least a partial bypass condition. This arrangement permits the engine, if required, to use nearly 100% of the maximum pump output capacity at maximum demand. At the time the engine is normally shut down, and if the electric fuel pump is also turned off, the conical end 42 of the plunger 36 will sit on the seat 32. This will cause the fuel in the line to be blocked from return to the tank. However, a slow reduction of pressure in the line will occur, because, by design, the seal formed between the parts 32 and 42 is not 100% effective, for the reasons set forth herein. If the electric fuel pump was not turned off when the engine was shut down, the regulator would respond to the resulting pressure increase and would bypass all of the now unused fuel through port 30 and back to the fuel tank.

As discussed above, the parts are designed as to always permit at least some flow through port 30 causing this fuel to be returned to the tank. If the plunger, in normal use, should shut completely, that would be an indication of something being not right, as examples the volume output from he fuel pump might not be sufficient to meet the needs of the engine, or that some large leak has developed in the fuel system.

Some prior art devices depend upon a build up of pressure within the regulator. This is into the case with the present invention, and that fact aids in the method of the present invention, that is, the part 30 is always at least a little open and there is always at least some corresponding small amount of fuel being by-passed to the tank. This is an important advantage over such prior art devices which are sealed at certain times during the cycle of operation;. That advantage is in addition to not requiring any means to creates such a seal, which mean are often expensive, prone to breakdown, and the like.

In successfully constructed commercial embodiments of the invention, it has been found that highly satisfactory operation results were the body parts 12 and 14 are made of aluminum and the plunger is made of steel, however, other metals and even certain non-metallic materials could also be used.

While the invention has been described in some detail above, it is to be understood that this detailed description is by wa of example only and the protection granted is to be limited only within the spirit of the invention and the scope of the following claims.

I claim:

1. A pressure regulator for use with an internal combustion engine having at least one carburetor, said regulator comprising a body portion, a chamber formed in said body portion, said chamber having an axis, a plurality of ports formed in said body portion around said axis, means to supply fuel into said chamber via one of said ports, means to supply fuel from said chamber to all of said at least one carburetor via respective other ones of said ports, a floe return port formed in said body portion substantially on said axis, valve means or cooperation with said fuel return port to control the volume of fuel flowing therethrough, said valve means being arranged to respond to engine demands for fuel so as to decrease the volume of fuel flowing through said return port as the engine demand for fuel increases, said valve means including an hourglass shaped plunger positioned for motion on and along said axis, said hourglass shaped plunge being so positioned within said chamber that the restriction to flow of fuel from said supply port to all of said other carburetor supply ports is minimized and so that fuel flow traps are not created in said regulator and so that the distribution of fuel to all of said other carburetor supply ports is even, said regulator also comprising a cap member, said valve means including a diaphragm, means to removable secure said cap to said body member with edge portions of said diaphragm sealingly sandwiched therebetween, said valve means including spring means for normally biasing said plunger member towards said return port, and said valve means comprising manually adjustable spring pressure adjustment means formed in said cap member.

2. The regulator of claim 1, wherein said valve means comprises a diaphragm, means to secure said plunger to said diaphragm, said valve means further comprising a conical end at the free end of said plunger, said conical portion being cooperable with said return port, and said hourglass shape of said plunger being positioned between said conical end and the portion of said plunger secured to said diaphragm.

3. The regulator of claim 1, said fuel supply port and said return port being of substantially equal size, and said other ports all being of a size substantially equal to each other but smaller than said supply port and said return port.

4. The regulator of claim 3, said supply port and said return port each being of a size substantially equal to each other.

5. The regulator of claim 1, said body portion having a hexagonal cross-sectional shape in planes perpendicular to said axis, and said body portion thus being formed with six flat surfaces corresponding to said hexagonal cross-sectional shape, and said supply port and said plurality of other ports totaling six in number and being located one in each of said six surfaces.

6. The regulator of claim 1, said chamber being of a cylindrical shape to assist in said minimization of said restriction to flow therethrough and the avoidance of fuel flow traps therein.

7. The regulator of claim 6, said plunger being located in said chamber substantially co-axially therein.

8. A method of operating a pressure regulator for use with an internal combustion engine, said engine including a fuel tank and a fuel pump arranged in a system to cause said pump to pump fuel from said tank to said pressure regulator, and said regulator including means to supply fuel from said regulator to said engine for combustion therein and means to return fuel from said regulator back to said tank, comprising the steps of forming a chamber in said regulator, providing valve means in said chamber, providing diaphragm means exposed to the pressure in the fuel supplied from said regulator to said engine, arranging said valve means with respect to said fuel return means so that as the demand for fuel by said engine increases the amount of fuel returned from said regulator to said tank decreases, forming a valve seat in said fuel return means, positioning said valve means for cooperation with said valve seat, and arranging the parts so that said valve member never completely closes said valve seat during normal operation of said pressure regulator at all levels of demand for fuel by said engine including full throttle demand.

9. The method of claim 8, wherein said engine includes a plurality of carburetors, wherein the operating pressure through said regulator is in the range of approximately 5 psi to approximately 7 psi.

10. The method of claim 8, wherein said forming said chamber step results in a chamber of cylindrical configuration, including a plunger in said valve means, and positioning said plunger substantially co-axially in said chamber to thereby minimize the restriction to flow of fuel through said chamber and eliminate fuel flow traps therein.

11. The method of claim 8, wherein said fuel pump is an electric fuel pump, and performing said step of arranging the parts so that said valve member never completely closes so that the pressure in the fuel line between said electric fuel pump and the regulator will behave in such a way that the current draw by said electric fuel pump is minimized.

12. A pressure regulator for use with an internal combustion engine having at least one carburetor, said regulator comprising a body portion, a chamber formed in said body portion, said chamber having an axis, a plurality of ports formed in said body portion around said axis, means to supply fuel into said chamber via one of said ports, means to supply fuel from said chamber to each carburetor of said at least one carburetor via respective other ones of said ports, a fuel return port formed in said body portion substantially on said axis, valve means for cooperation with said fuel return port to control the volume of fuel flowing therethrough, said valve means being arranged to respond to engine demand for fuel so as to decrease the volume of fuel flowing through said return port as the engine demand for fuel increases said body portion having a hexagonal cross-sectional shape in planes perpendicular to said axis and said body portion thus being formed with six flat surfaces corresponding to said hexagonal cross-sectional shape, and said supply port and said plurality of other ports totaling six in number and being located one in each of said six surfaces.

13. The regulator of claim 12, said valve means including an hourglass shaped plunger positioned for motion on and along said axis, and said hourglass shaped plunger being so positioned within said chamber that the restriction to flow of fuel from said supply port to all of said other carburetor supply ports is minimized and so that fuel flow traps are not created in said regulator.

14. The regulator of claim 13 wherein said valve means comprises a diaphragm, means to secure said plunger to said diaphragm, said valve means further comprising a conical end at the free end of said plunger, said conical portion being cooperable with said return port, and said hourglass shape of said plunger being positioned between said conical end and the portion of said plunger secured to said diaphragm.

15. The regulator of claim 12, said fuel supply port and said return port being of substantially equal size, and said other ports all being of a size substantially equal to each other but smaller than said supply port and said return port.

16. The regulator of claim 15, said supply port and said return port each being of a size substantially equal to each other.

17. The regulator of claim 13, said regulator also comprising a cap member, said valve means including a diaphragm, means to removably secure said cap to said body member with edge portions of said diaphragm sealingly sandwiched therebetween, said valve means including spring means for normally biasing said plunger member towards said return port, and said valve means comprising manually adjustable spring pressure adjustment means formed in said cap member.

18. The regulator of claim 12, said chamber being of a cylindrical shape to assist in said minimization of said restriction to flow therethrough and the avoidance of fuel flow traps therein.

19. The regulator of claim 18, said valve means having an operative portion located in said cylindrical chamber substantially co-axially therein for motion along said common axis.

20. The regulator of claim 12, and a mounting bracket for said regulator, said bracket being of an "L" shaped configuration and comprising a mounting leg and a regulator leg, said regulator leg being formed with a pair of fingers between which said regulator may be fitted and each finger being formed with a through hole adapted to accept a mounting screw, and said bracket being reversible with respect to said regulator to thereby provide two alternate mounting positions of said regulator with respect to said mounting leg.

* * * * *